United States Patent
Wang et al.

(10) Patent No.: US 11,184,465 B2
(45) Date of Patent: Nov. 23, 2021

(54) NETWORK COMMUNICATION FOR ESTABLISHING A QUIC CONNECTION

(71) Applicant: Shanghai Bilibili Technology Co., Ltd., Shanghai (CN)

(72) Inventors: Sheng Wang, Shanghai (CN); Quan Zhou, Shanghai (CN); Shangzhi Cai, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 72 days.

(21) Appl. No.: 16/634,867

(22) PCT Filed: Oct. 17, 2019

(86) PCT No.: PCT/CN2019/111686
§ 371 (c)(1),
(2) Date: Jan. 28, 2020

(87) PCT Pub. No.: WO2020/192092
PCT Pub. Date: Oct. 1, 2020

(65) Prior Publication Data
US 2021/0234944 A1    Jul. 29, 2021

(30) Foreign Application Priority Data

Mar. 28, 2019   (CN) .......................... 201910243785.8

(51) Int. Cl.
*H04L 29/06* (2006.01)
*H04L 29/12* (2006.01)
*H04L 29/08* (2006.01)

(52) U.S. Cl.
CPC ........ *H04L 69/165* (2013.01); *H04L 61/1511* (2013.01); *H04L 63/101* (2013.01); *H04L 67/141* (2013.01); *H04L 69/24* (2013.01)

(58) Field of Classification Search
CPC . H04L 69/165; H04L 61/1511; H04L 63/101; H04L 67/141; H04L 69/24
See application file for complete search history.

(56) References Cited

U.S. PATENT DOCUMENTS

2017/0118314 A1   4/2017  Lin et al.
2019/0199835 A1*  6/2019  Deval .................. H04L 69/326
(Continued)

FOREIGN PATENT DOCUMENTS

CN   101076026 A    11/2007
CN   105827537 A    8/2016
(Continued)

OTHER PUBLICATIONS

International Patent Application No. PCT/CN2019/111686; Int'l Search Report and the Written Opinion; dated Jan. 10, 2020; 9 pages.

*Primary Examiner* — Mohamed A. Wasel
(74) *Attorney, Agent, or Firm* — BakerHostetler

(57) ABSTRACT

Techniques for network communication are described herein. The disclosed techniques include generating a request for accessing a target server by a computing device, the request comprising a URL; determining whether to select a QUIC transport protocol based on the URI; selecting the QUIC transport protocol in response to a determination that the URL comprises QUIC identification information; and establishing a QUIC connection with the target server via a QUIC stack of the computing device according to the QUIC transport protocol.

19 Claims, 9 Drawing Sheets

(56) References Cited

U.S. PATENT DOCUMENTS

| | | | |
|---|---|---|---|
| 2019/0229903 A1* | 7/2019 | Balasubramanian | ........................ H04L 9/0861 |
| 2019/0320479 A1* | 10/2019 | Choudhary | ............. H04L 69/14 |
| 2020/0128038 A1* | 4/2020 | Neystadt | ................. G06N 20/00 |
| 2020/0204519 A1* | 6/2020 | Isaev | ...................... H04L 9/3268 |
| 2021/0045186 A1* | 2/2021 | Fu | ....................... H04L 63/0428 |
| 2021/0274025 A1* | 9/2021 | Novo Diaz | ............. H04L 69/22 |

FOREIGN PATENT DOCUMENTS

| | | |
|---|---|---|
| CN | 106489145 A | 3/2017 |
| CN | 106656909 A | 5/2017 |
| CN | 109218762 A | 1/2019 |
| CN | 109309685 A | 2/2019 |
| CN | 109314662 A | 2/2019 |
| WO | WO 2018/210428 A1 | 11/2018 |

* cited by examiner

NETWORK COMMUNICATION FOR ESTABLISHING A QUIC CONNECTION

CROSS-REFERENCE TO RELATED APPLICATION

The present application is the U.S. National Stage of International Application No. PCT/CN2019/111686, filed on Oct. 17, 2019, which claims priority of Chinese patent application No. 201910243785.8, filed on Mar. 28, 2019. The entire disclosure of the above-identified application is hereby incorporated by reference and made a part of this specification.

BACKGROUND

The hypertext transfer protocol (HTTP) transport protocol built on the transmission control protocol (TCP) is a network transport protocol most widely used in the Internet, used for transmitting hypertext markup language (HTML) documents from a server to a computer device. However, with the increase of images, video, and other multimedia contents, the increased multimedia content means that HTML pages become more complex, making page load time longer than ever. In the above context, quick UDP Internet connections (QUIC) transport protocol is proposed.

SUMMARY

The object of the embodiments of the present application is to provide a network communication method, system, computing device, and computer-readable storage medium, which is to solve the problem of network latency when a computing device initially accesses a target server because the computing device can not directly establish a network connection with the target server based on the QUIC transport protocol.

One aspect of the embodiments of the present application provides a network communication method, comprising: determining whether to select a QUIC transport protocol according to a URI; and establishing a QUIC connection with a target server when the QUIC transport protocol is selected.

Preferably, the determining whether to select the QUIC transport protocol according to the URI comprises: determining whether the URI comprises QUIC identification information, the QUIC identification information indicating that the target server supports the QUIC transport protocol; and selecting the QUIC transport protocol when the URI comprises the QUIC identification information.

Preferably, the determining whether to select the QUIC transport protocol according to the URI further comprises: selecting another transport protocol when the URI does not comprise the QUIC identification information.

Preferably, the determining whether to select the QUIC transport protocol according to the URI further comprises: inquiring whether a domain name whitelist comprises a target server domain name of the URI, when the URI does not comprise the QUIC identification information; and selecting the QUIC transport protocol when the domain name whitelist comprises the target server domain name of the URI.

Preferably, the selecting the QUIC transport protocol when the domain name whitelist comprises the target server domain name of the URI in the domain name whitelist further comprises: generating an alternate URI according to the URI, the alternate URI comprising the QUIC identification information; establishing the QUIC connection with the target server based on the alternate URI.

Preferably, the determining whether to select the QUIC transport protocol according to the URI further comprises: selecting another transport protocol when the domain name whitelist does not comprise the target server domain name of the URI.

Preferably, the determining whether to select the QUIC transport protocol according to the URI further comprises: selecting both the QUIC transport protocol and another transport protocol when the domain name whitelist does not comprise the target server domain name of the URI.

Preferably, the network communication method further comprising: establishing the QUIC connection with the target server based on the QUIC transport protocol and establishing another network connection with the target server based on the another transport protocol; and performing a data transmission operation via the QUIC connection or the another network connection.

Preferably, the selecting the data transmission operation via the QUIC connection or the another network connection further comprises: detecting a network connection state with the target server, the network connection state comprising a QUIC connection state of the QUIC connection and another network connection state of the another network connection; determining, according to the network connection state, whether the QUIC connection is successfully established, and whether the another network connection is successfully established; performing the data transmission operation via the QUIC connection, when the QUIC connection is successfully established and the another network connection is not successfully established; and performing the data transmission operation via the another network connection, when the another network connection is successfully established and the QUIC connection is not successfully established.

Preferably, the selecting the data transmission operation via the QUIC connection or the another network connection further comprises: when the another network connection is successfully established and the QUIC connection is successfully established: performing, according to a pre-configured transport protocol priority, the data transmission operation via the QUIC connection or the another network connection; wherein, the transport protocol priority is configured to indicate a priority usage level between the QUIC transport protocol and the another transport protocol.

Preferably, the selecting the data transmission operation via the QUIC connection or the another network connection further comprises: when the another network connection is successfully established and the QUIC connection is successfully established: obtaining network connection parameters for indicating network transmission quality, the network connection parameters comprising QUIC connection parameters of the QUIC connection and other network connection parameters of the another network connection; performing, according to the network connection parameters, the data transmission operation via the QUIC connection or the another network connection.

Preferably, the determining whether to select the QUIC transport protocol according to the URI further comprises: determining whether to update the domain name list according to the target server domain name of the URI, when the domain name whitelist does not comprise the target server domain name; wherein, the domain name list comprises the domain name whitelist, and the domain name whitelist comprises a plurality of domain names supporting the QUIC transport protocol.

Preferably, the domain name whitelist further comprises a plurality of QUIC service parameters respectively relating to the plurality of domain names, each QUIC service parameter comprising QUIC transport protocol versions supported by a corresponding server.

Preferably, determining whether to update the domain name list according to the target server domain name of the URI further comprises: sending an asynchronous access request to the target server, the asynchronous access request configured to request to establish a test network connection with the target server based on the QUIC transport protocol; determining whether the test network connection is successfully established; updating the target server domain name into the domain name whitelist when the test network connection is successfully established.

Preferably, determining whether to update the domain name list according to the target server domain name of the URI further comprises: inquiring whether the domain name whitelist comprises the target server domain name of the URI, when the test network connection is not successfully established; deleting the target server domain name from the domain name whitelist, when the domain name whitelist comprises the target server domain name of the URI.

Preferably, the domain name list further comprises a domain name blacklist, the domain name blacklist comprising a plurality of server domain names that do not support the QUIC transport protocol; the determining whether to update the domain name list according to the target server domain name of the URI further comprises: updating the target server domain name into the domain name blacklist when the test network connection is not successfully established.

Preferably, the determining whether to update the domain name list according to the target server domain name of the URI further comprises: receiving a QUIC parameter from the target server; determining, according to the QUIC parameter, whether the QUIC connection is able to be established with the target server; updating the target server domain name into the domain name whitelist when the QUIC connection is able to be established with the target server.

Preferably, the QUIC identification information is HTTP Scheme of the URI, the HTTP Scheme comprising one or more characters following "HTTP".

Preferably, the QUIC identification information comprises a predetermined character string, the predetermined character located in query-string parameters of the URI.

Another aspect of the embodiments of the present application provides a network communication system, comprising: a selecting module, determining whether to select a QUIC transport protocol according to a URI; a network connection module, establishing a QUIC connection with a target server based on the QUIC transport protocol, when the QUIC transport protocol is selected.

Yet another aspect of the embodiments of the present application provides a computing device, which comprises a memory, a processor, and one or more computer programs that stored in the memory and operable on the processor, wherein the processor executes the one or more computer programs for implementing a network communication method as described above.

Yet another aspect of the embodiments of the present application provides a computer-readable storage medium, which stores one or more computer programs, the one or more programs can be executed by at least one processor, cause the at least one processor to implement a network communication method as described above.

The network communication method, system, computing device, and computer-readable storage medium provided by the embodiments of the present application can select whether to establish a QUIC connection with the target server based on the QUIC transport protocol according to the URI. For example, if the URI is identified that the target server supports the QUIC transport protocol, the computing device can establish a network connection with the target server based on the QUIC transport protocol, thereby avoiding the network latency when the computing device initially accesses the target server.

DETAILED DESCRIPTION OF ILLUSTRATIVE EMBODIMENTS

To make the objectives, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

Embodiment 1

Figure 1:
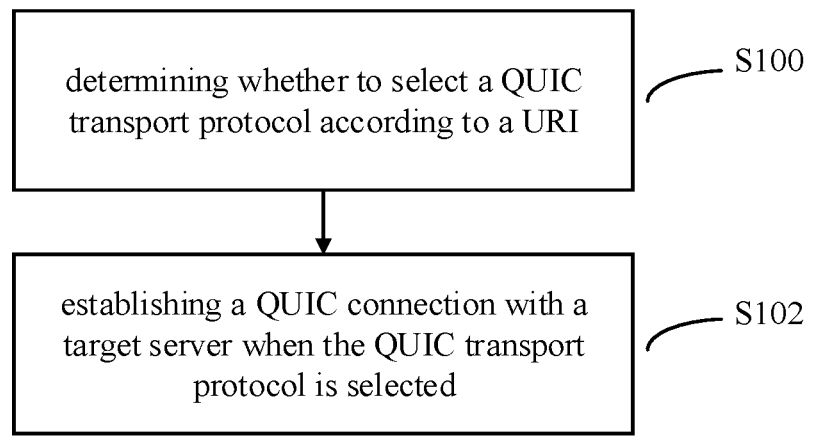
FIG. 1 illustrates a flowchart of a network communication method according to a first embodiment of the present application.

FIG. 1 illustrates a flowchart of a network communication method according to a first embodiment of the present application. It should be understood that the flowchart of the embodiment is not intended to limit the order of the steps. The method is exemplarily described below using a computing device 2 as an executive body.

As shown in FIG. 1, the network communication method includes steps S100~S102, wherein: Step S100, determining whether to select a QUIC (quick UDP internet connections) transport protocol according to a uniform resource identifier (hereinafter URI).

In one exemplary embodiment, the step S100 may include the following steps of:

determining whether the URI comprises QUIC identification information, the QUIC identification information configured to indicate that the target server supports the QUIC transport protocol; and selecting the QUIC transport protocol when the URI comprises the QUIC identification information.

In one exemplary embodiment, the QUIC identification information is HTTP Scheme of the URI, the HTTP Scheme comprising one or more characters following "HTTP".

For example, if the computing device is provided with a URI as follows: "httpq://hostname[:port]/path/[;parameters][?query]#fragment", the QUIC transport protocol can be selected based on a fact that an HTTP Scheme of the URI is "httpq". However, the HTTP Scheme also may be "HTTPW", "HTTPZ" or the like, other than "https".

The exemplary embodiment above is not intended to limit the present application, the HTTP Scheme also may be "QUIC", "iQUIC", "gQUIC" or the like.

In one exemplary embodiment, the QUIC identification information may include a predetermined character string, and the predetermined character may be located in query-string parameters of the URI.

For example, if the computing device is provided with a URI as follows: "httpq://hostname[port]/path/[;parameters][?query]#fragment" and the [?query] is set with the predetermined character string for supporting the QUIC transport protocol, such as "isquic", the QUIC transport protocol will be selected. However, the predetermined character string is not limited to the "isquic", and also may be replaced with other character string.

The exemplary embodiment above is not intended to limit the present application, the character string also may be located in "[;parameters]", or located in another field of the URI.

Step S102, establishing a QUIC connection with a target server when the QUIC transport protocol is selected.

Figure 2:
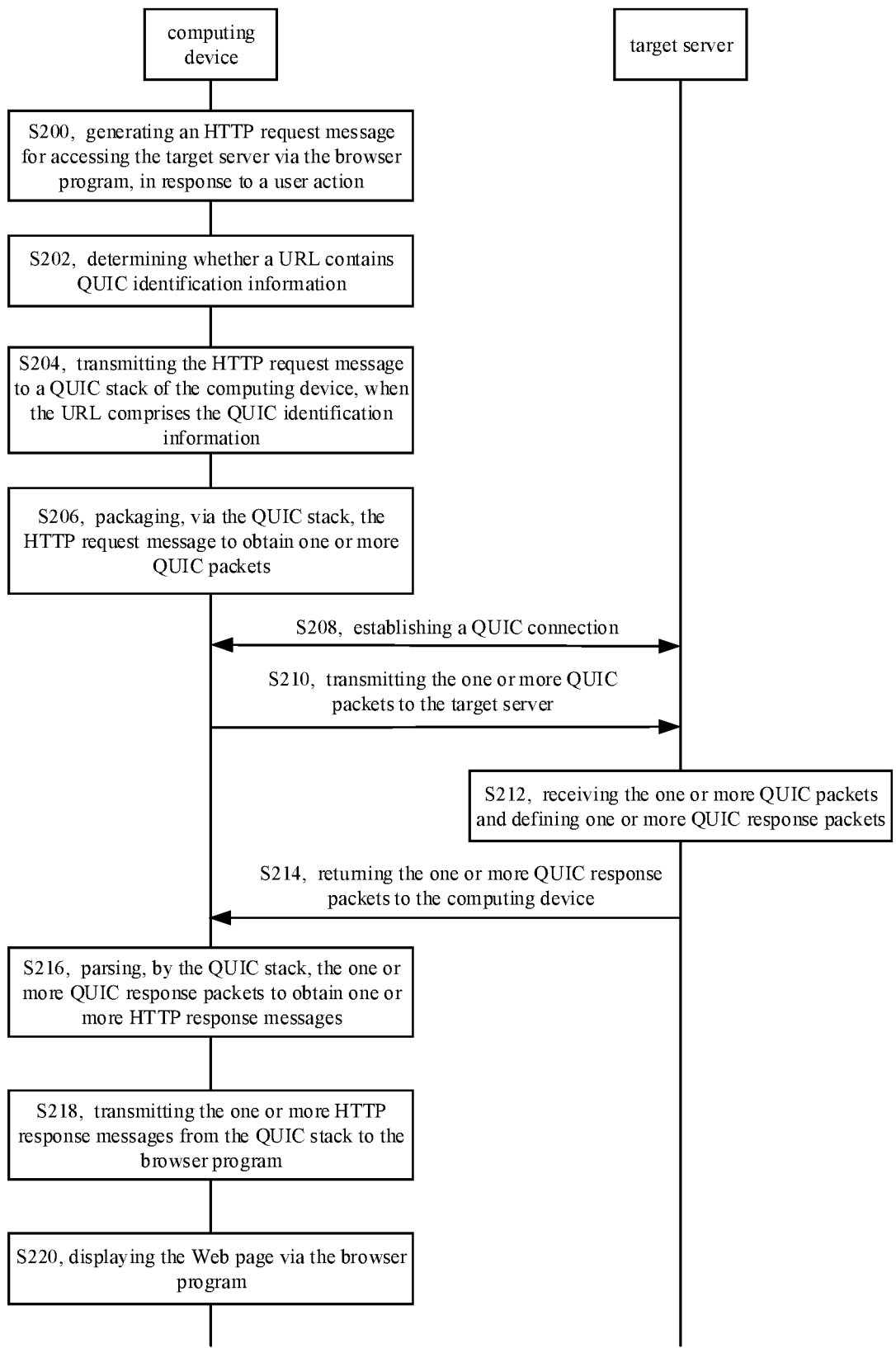
FIG. 2 illustrates another flowchart of a network communication method in one using scene according to the first embodiment of the present application.

FIG. 2 illustrates another flowchart of a network communication method in one using scene, which includes a computing device and a target server, the computing device has installed a browser program. The flowchart is to disclose: an exemplary flowchart that the computing device initially accesses a website of the target server. More detail will be described as follows.

Step S200, generating an HTTP request message for accessing the target server via the browser program, in response to a user action. The request message includes a request method (e.g., GET, or POST), a URL (uniform resource locator), a transport protocol version, an HTTP header, and an HTTP body.

Step S202, determining whether the URL comprises QUIC identification information; For example, a URL Scheme of the URL is "httpq".

Step S204, transmitting the HTTP request message to a QUIC stack of the computing device, when the URL comprises the QUIC identification information;

Step S206, packaging, via the QUIC stack, the HTTP request message to obtain one or more QUIC packets;

Step S208, establishing a QUIC connection with the target server;

Step S210, transmitting, via the QUIC connection established at step S208, the one or more QUIC packets to the target server;

Step S212, the target server receives the one or more QUIC packets and defines one or more QUIC response packets;

Step S214, the target server returns the one or more QUIC response packets to the computing device;

Step S216, parsing, by the QUIC stack, the one or more QUIC response packets to obtain one or more HTTP response messages;

Step S218, transmitting the one or more HTTP response messages from the QUIC stack to the browser program;

Step S220, displaying the Web page via the browser program.

It should be understood that the network communication method of the first embodiment selects whether to establish the QUIC connection with the target server based on the QUIC transport protocol according to the URI. For example, if the URI is identified that the target server supports the QUIC transport protocol, the computing device can establish a network connection with the target server based on the QUIC transport protocol, thereby avoiding the network latency when the computing device initially accesses the target server.

Embodiment 2

Figure 3:
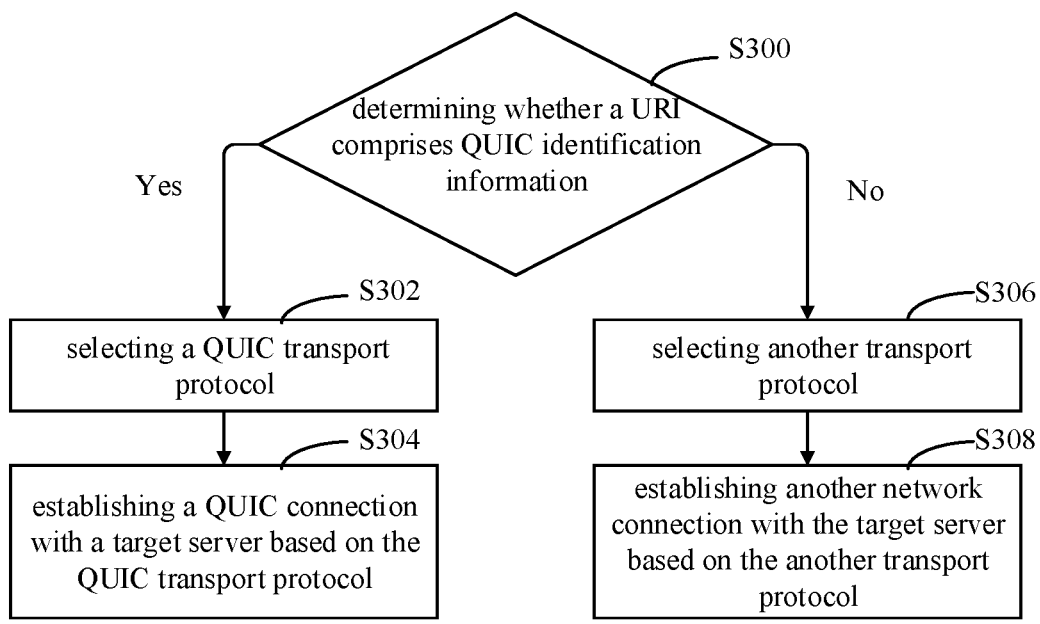
FIG. 3 illustrates a flowchart of a network communication method according to a second embodiment of the present application.

FIG. 3 illustrates a flowchart of a network communication method according to a second embodiment of the present application. The network communication method includes steps S300~S310, wherein:

Step S300, determining whether a URI comprises QUIC identification information. If yes, the process goes to step S302; if no, the process goes to step S306.

Wherein, the QUIC identification information is configured to indicate that the target server supports a QUIC transport protocol.

Step S302, selecting the QUIC transport protocol.

Step S304, establishing a QUIC connection with a target server based on the QUIC transport protocol.

Step S306, selecting another transport protocol.

Wherein, the another transport protocol may be TCP (transmission control protocol), UDP or like. The another transport protocol is preferably the TCP based on a high-requirement of data integrity.

Step S308, establishing another network connection with the target server based on the another transport protocol.

In one exemplary embodiment, when the URI does not comprise the QUIC identification information, the method further includes steps of determining whether to update a pre-configured domain name list according to a target domain name in the URI, and determining whether to update the target domain name into the domain name list based on a determination result. Wherein, the domain name list includes the domain name whitelist, and the domain name whitelist includes a plurality of domain names supporting the QUIC transport protocol.

In one exemplary embodiment, when the URI does not comprise the QUIC identification information, the method further includes: refusing to respond to a data transmission request with the URI, without selecting any transport protocol.

Embodiment 3

Figure 4:
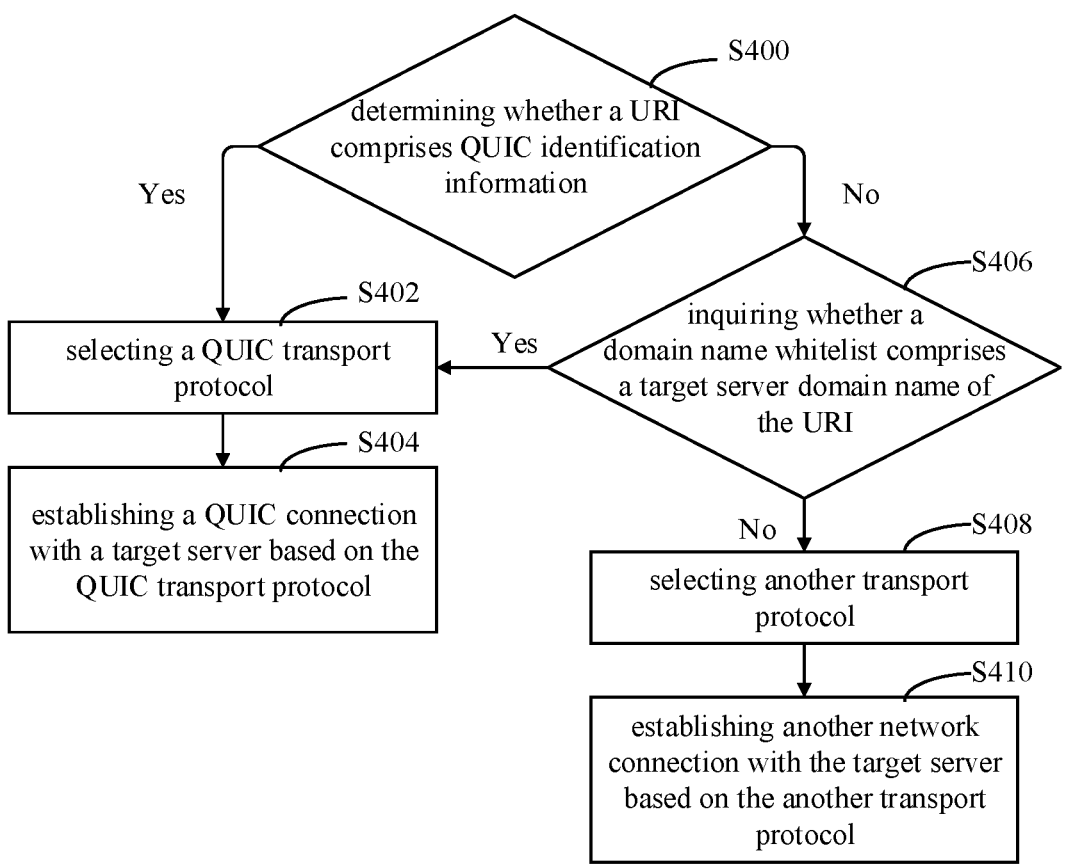
FIG. 4 illustrates a flowchart of a network communication method according to a third embodiment of the present application.

FIG. 4 illustrates a flowchart of a network communication method according to a third embodiment of the present application. The network communication method includes steps S400~S410, wherein:

Step S400, determining whether a URI comprises QUIC identification information. If yes, the process goes to step S402; if no, the process goes to step S406.

Wherein, the QUIC identification information is configured to indicate that the target server supports a QUIC transport protocol.

Step S402, selecting the QUIC transport protocol.

Step S404, establishing a QUIC connection with a target server based on the QUIC transport protocol.

In one exemplary embodiment, the QUIC connection is established with the target server based on the URI, when the URI comprises the QUIC identification information.

In one exemplary embodiment, when the URI does not comprise the QUIC identification information, the QUIC connection can be established by the following steps: (1) generating an alternate URI according to the URI, the alternate URI comprising the QUIC identification information; (2) establishing the QUIC connection with the target server based on the alternate URI.

For example, https://test.domain.com/index.html, if the foregoing URI does not comprise QUIC identification information, "https://test.domain.com/index.html" can be converted to "httpq://test.domain.com/index.html", and the QUIC connection is able to be established with the target server via the "httpq://test.domain.com/index.html".

Step S406, inquiring whether a domain name whitelist comprises a target server domain name of the URI. If yes, the process goes to step S402; if no, the process goes to step S408.

Wherein, the domain name whitelist includes a plurality of domain names supporting the QUIC transport protocol. The domain name whitelist may be pre-configured and updated according to access records of the computing device.

Step S408, selecting another transport protocol.

Wherein, the another transport protocol may be TCP (transmission control protocol), UDP or like. The another transport protocol is preferably the TCP based on a high-requirement of data integrity.

Step S410, establishing another network connection with the target server based on the another transport protocol.

It should be understood that the network communication method of the third embodiment determines, based on the first embodiment, whether to directly establish the QUIC connection with the target server, according to the target server domain name of the URI or a determination that the URI comprises identification information, thereby avoiding the network latency when the computing device initially accesses the target server.

Embodiment 4

Figure 5:
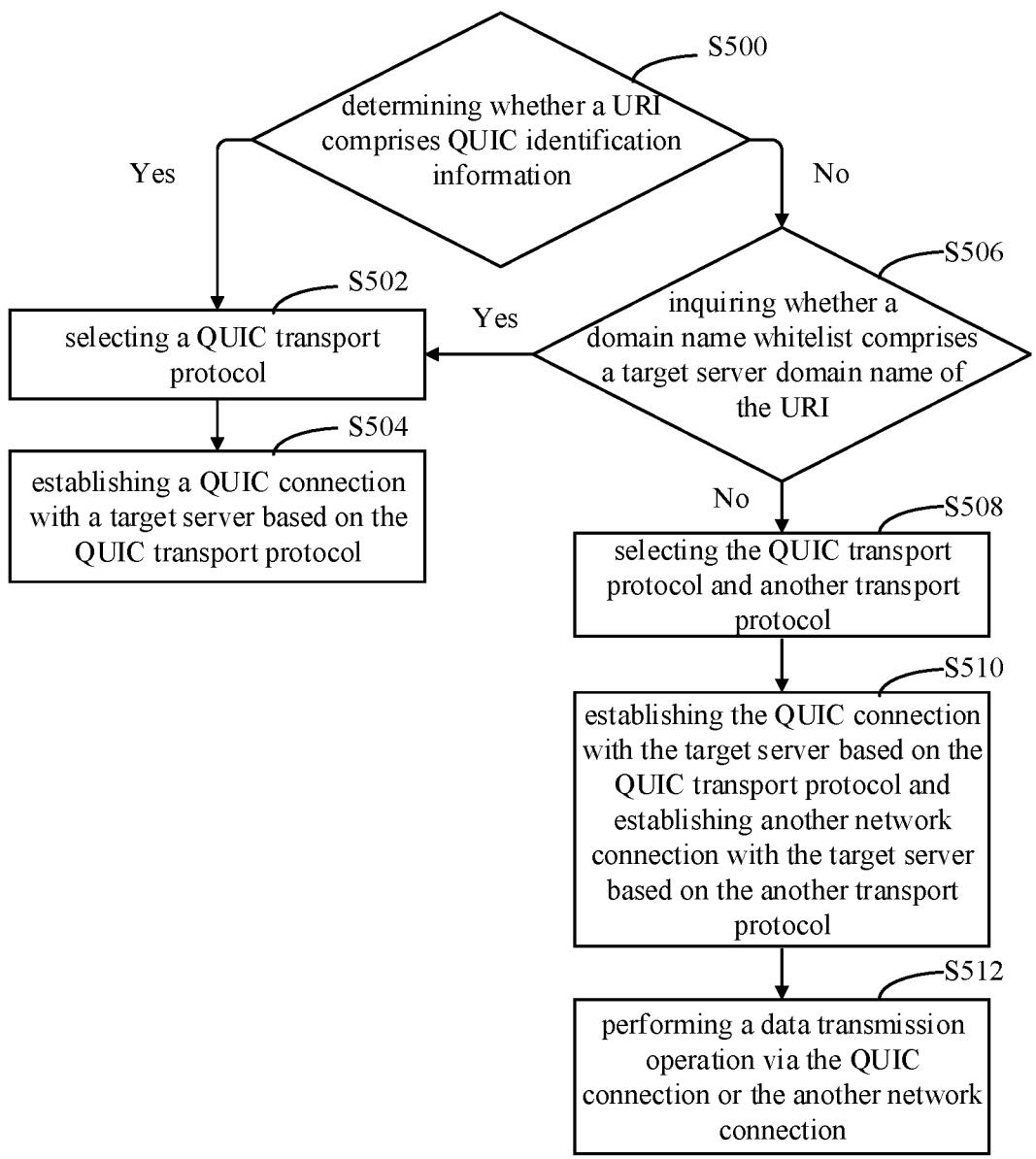
FIG. 5 illustrates a flowchart of a network communication method according to a fourth embodiment of the present application.

FIG. 5 illustrates a flowchart of a network communication method according to a fourth embodiment of the present application. The network communication method includes steps S500~S512, wherein:

Step S500, determining whether a URI comprises QUIC identification information. If yes, the process goes to step S502; if no, the process goes to step S506.

Wherein, the QUIC identification information is configured to indicate that the target server supports a QUIC transport protocol.

Step S502, selecting the QUIC transport protocol.

Step S504, establishing a QUIC connection with a target server based on the QUIC transport protocol.

Step S506, inquiring whether a domain name whitelist comprises a target server domain name of the URI. If yes, the process goes to step S502; if no, the process goes to step S508.

Wherein, the domain name whitelist includes a plurality of domain names supporting the QUIC transport protocol. The domain name whitelist may be pre-configured and updated according to access records of the computing device.

Step S508, selecting both the QUIC transport protocol and another transport protocol.

Step S510, establishing the QUIC connection with the target server based on the QUIC transport protocol and establishing another network connection with the target server based on the another transport protocol.

For example, https://test.domain.com/index.html, if the foregoing URI does not comprise QUIC identification information, "https://test.domain.com/index.html" is converted to "httpq://test.domain.com/index.html", and the QUIC connection is able to be established with the target server via the "httpq://test.domain.com/index.html", and the another network connection can be established with the target server via the "https://test.domain.com/index.html"

Step S512, performing a data transmission operation via the QUIC connection or the another network connection.

In one exemplary embodiment, the step S512 may include steps S512A~S512F:

Step S512A, detecting a network connection state with the target server, the network connection state including a QUIC connection state of the QUIC connection and another network connection state of the another network connection.

Step S512B, determining, according to the network connection state, whether the QUIC connection is successfully established, and whether the another network connection is successfully established.

Specifically, determining whether the QUIC connection is successfully established by the QUIC connection state, and determining whether the another network connection is successfully established by the another network connection state.

Step S512C, performing the data transmission operation via the QUIC connection, when the QUIC connection supports and the another network connection is not successfully established.

Step S512D, performing the data transmission operation via the another network connection, when the another network connection is successfully established and the QUIC connection is not successfully established.

Step S512E, when the QUIC connection is not successfully established and the another network connection is successfully established, the QUIC connection or other network connection is selected for the data transmission operation by the following strategies:

Strategy one: performing, according to a pre-configured transport protocol priority, the data transmission operation via the QUIC connection or the another network connection. Wherein, the transport protocol priority is configured to indicate a priority usage level between the QUIC transport protocol and the another transport protocol. Exemplary, a priority of the QUIC transport protocol is higher than a priority of the another transport protocol.

Strategy two: obtaining network connection parameters for indicating network transmission quality, the network connection parameters including QUIC connection parameters of the QUIC connection and other network connection parameters of the another network connection; performing, according to the network connection parameters, the data transmission operation via the QUIC connection or the another network connection.

The network connection parameters, such as an initial frame time, may be parameters for indicating transmission efficiencies, performance indicators, and/or the like. It's not difficult to understand that, theoretically speaking, when a communication connection is established with the target server simultaneously based on the QUIC transport protocol and another transport protocol (e.g., TCP), the QUIC connection based on the QUIC transport protocol is more easily selected to perform the data transmission operation, since the QUIC transport protocol has advantages of stream multiplexing, low-latency and the like.

It should be noted that the above fourth embodiment also can update the domain name whitelist or the domain name blacklist by a "test network connection" or "QUIC parameters".

It should be understood that the network communication method of the fourth embodiment, when the URI does not comprise the QUIC identification information, establishes network connections with the target server based on the QUIC transport protocol and another transport protocol, respectively, to improve access efficiency, and to avoid a connection failure event caused by establishing the network connection only based on the another transport protocol when the target server only supports the QUIC transport protocol and does not support the another transport protocol (e.g., TCP).

Embodiment 5

Figure 6:
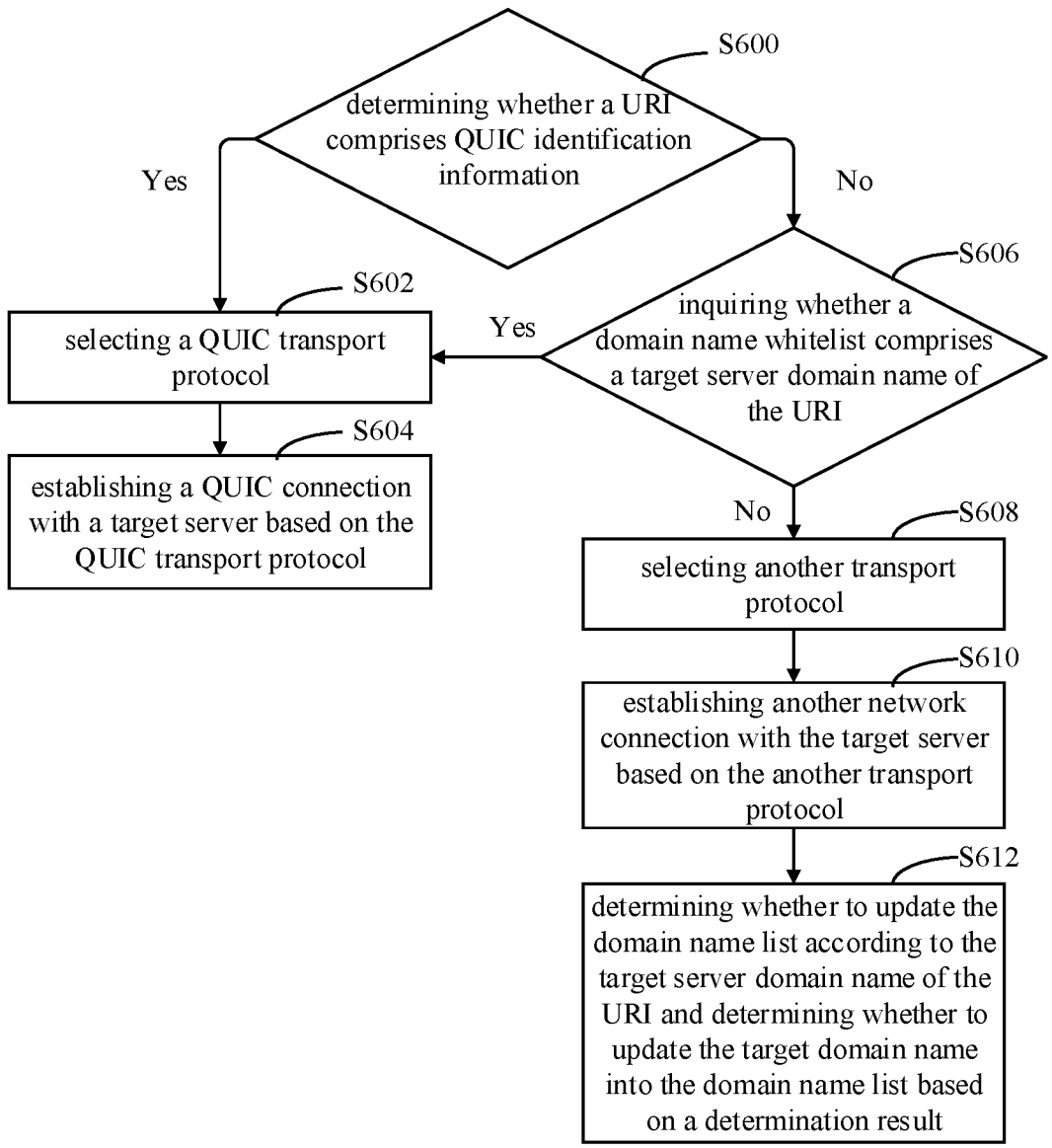
FIG. 6 illustrates a flowchart of a network communication method according to a fifth embodiment of the present application.

FIG. 6 illustrates a flowchart of a network communication method according to a fifth embodiment of the present application. The network communication method includes steps S600~S612, wherein:

Step S600, determining whether a URI comprises QUIC identification information. If yes, the process goes to step S602; if no, the process goes to step S606.

Wherein, the QUIC identification information is configured to indicate that the target server supports a QUIC transport protocol.

Step S602, selecting the QUIC transport protocol.

Step S604, establishing a QUIC connection with a target server based on the QUIC transport protocol.

Step S606, inquiring whether a domain name whitelist comprises a target server domain name of the URI. If yes, the process goes to step S602; if no, the process goes to step S608.

Wherein, the domain name whitelist includes a plurality of domain names supporting the QUIC transport protocol. The domain name whitelist may be pre-configured and updated according to access records of the computing device.

Step S608, selecting another transport protocol.

Wherein, the another transport protocol may be TCP (transmission control protocol), UDP or like. The another transport protocol is preferably the TCP based on a high-requirement of data integrity.

Step S610, establishing another network connection with the target server based on the another transport protocol.

In one exemplary embodiment, the computing device is further configured with a list system, and the network communication method further includes:

Step S612, determining whether to update the domain name list according to the target server domain name of the URI and determining whether to update the target domain name into the domain name list based on a determination result.

Wherein, the domain name list includes the domain name whitelist, and the domain name whitelist includes a plurality of domain names supporting the QUIC transport protocol. Furthermore, the domain name whitelist also includes a plurality of QUIC service parameters respectively relating to the plurality of domain names, each QUIC service parameter comprising QUIC transport protocol versions, signature certificates and the like.

Figure 7:
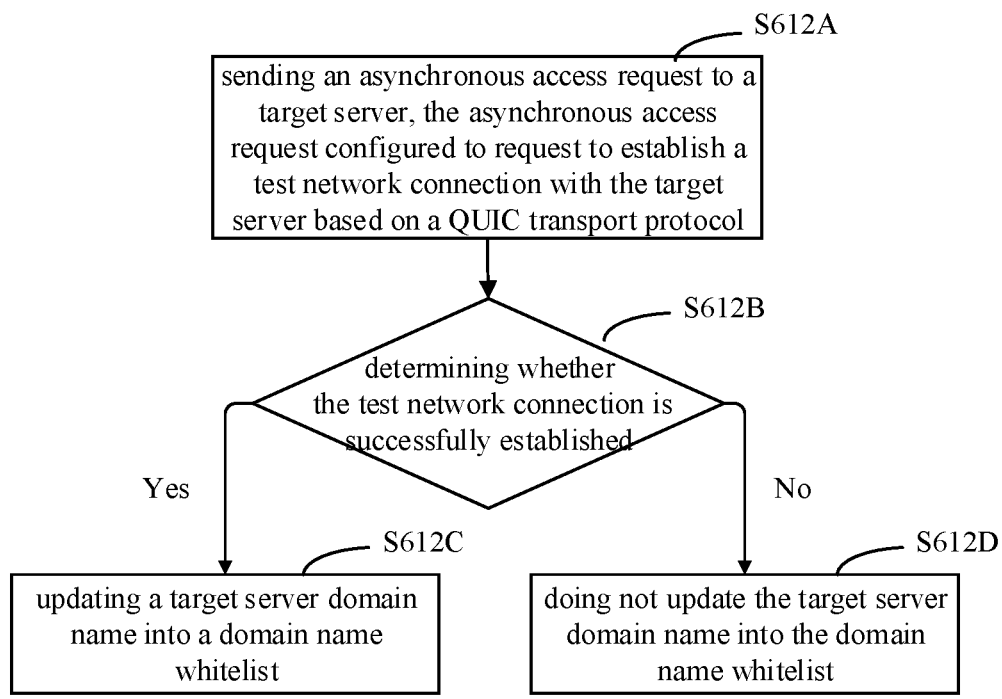
FIG. 7 illustrates a flowchart of step S612 of FIG. 6.

In one exemplary embodiment, as illustrated in FIG. 7, the step S612 may include steps S612A~S612D.

Step S612A, sending an asynchronous access request to the target server, the asynchronous access request configured to request to establish a test network connection with the target server based on the QUIC transport protocol.

Step S612B, determining whether the test network connection is successfully established.

If yes, the process goes to step S612C; if no, the process goes to step S612D.

Step S612C, updating the target server domain name into the domain name whitelist. Step S612D, doing not update the target server domain name into the domain name whitelist. For example, https://test.domain.com/index.html, if the foregoing URI does not comprise QUIC identification information, the another network connection is established based on the another transport protocol (e.g., TCP) and the data transmission operation is performed via the another network connection. Additional, the computing device further initiates, via another thread or process, a test network connection to the target server based on the QUIC transport protocol, the test network connection is used for determining whether the computing device can connect with the target server based on the QUIC transport protocol, rather than for transmitting data. If the test network connection is successfully established, it indicates that the computing device can establish a QUIC connection with the target server, that is, the target server supports the QUIC transport protocol, and therefore, the target server domain name "test.domain.com" is added to the domain name whitelist. If the test network connection is not successfully established, it indicates that the computing device cannot establish a QUIC connection with the target server, that is, the target server does not support the QUIC transport protocol, or transport protocol versions of the QUIC transport protocol supported by the target server are not compatible with any transport protocol version of the computing device, therefore, the target server domain name "test.domain.com" is not added to the domain name whitelist.

Figure 8:
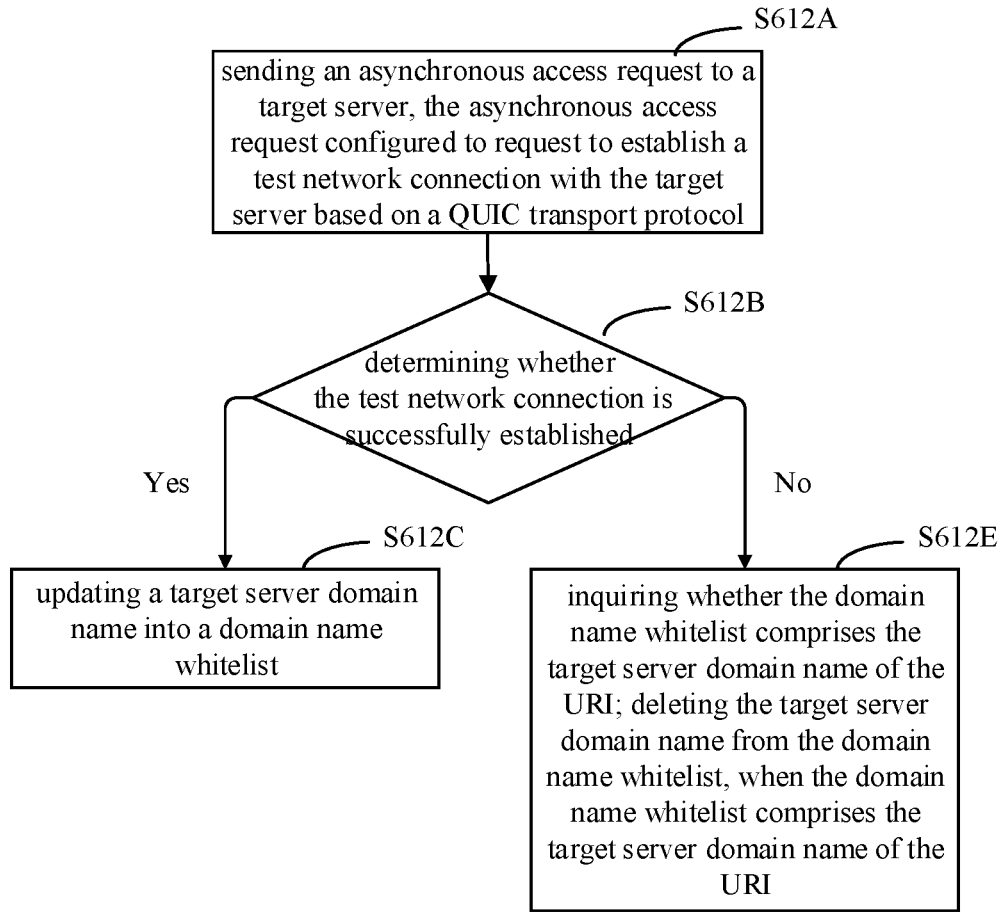
FIG. 8 illustrates another flowchart of step S612 of FIG. 6.

In one exemplary embodiment, as illustrated in FIG. 8, the step S612 further include step S612E: inquiring whether the domain name whitelist comprises the target server domain name of the URI, when the test network connection is not successfully established; deleting the target server domain name from the domain name whitelist, when the domain name whitelist comprises the target server domain name of the URI.

In the above example, if the test network connection is not successfully established, inquiring whether the domain name whitelist includes "test.domain.com"; if yes, deleting "test.domain.com" from the domain name whitelist to ensure the reliability of the domain name whitelist.

Figure 9:
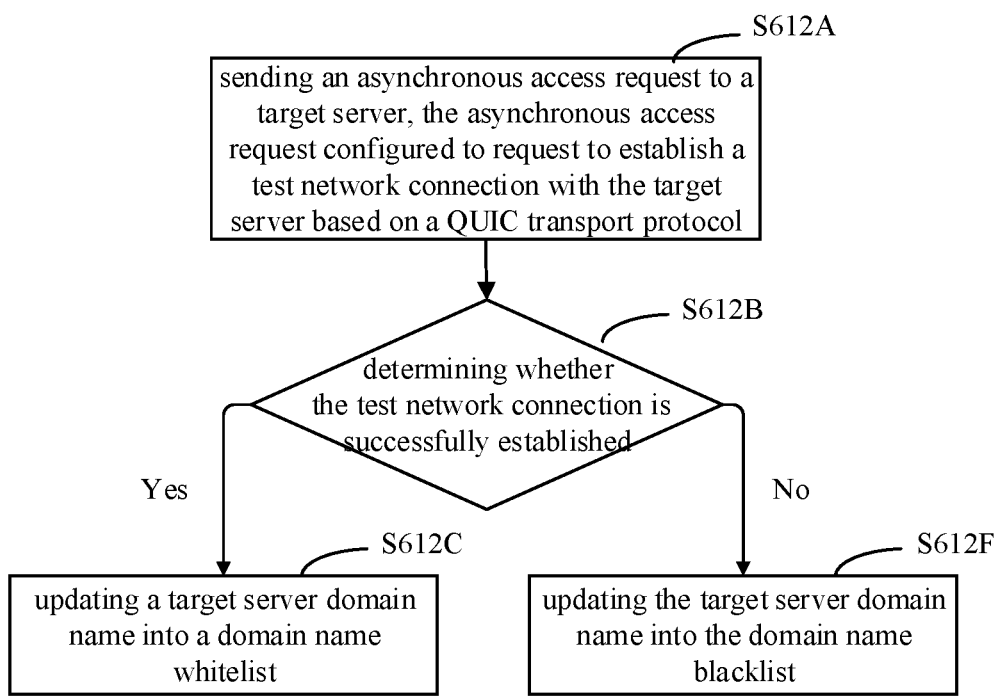
FIG. 9 illustrates another flowchart of step S612 of FIG. 6.

In one exemplary embodiment, as illustrated in FIG. 9, the step S612 further includes step S612F: updating the target server domain name into the domain name blacklist when the test network connection is not successfully established.

The domain name blacklist may include a plurality of server domain names that do not support the QUIC transport protocol, and a plurality of server domain names corresponding to a plurality of servers in which transport protocol versions of the QUIC transport protocol are incompatible with any transport protocol version of the computing device.

The network communication method described in the fifth embodiment establishes a list system based on the third embodiment, and determines whether a QUIC connection based on the QUIC transport protocol can be established with the target server by a "test network connection". The list system is configured to provide a transport protocol selection basis when the computing device subsequently accesses the target server.

Embodiment 6

Figure 10:
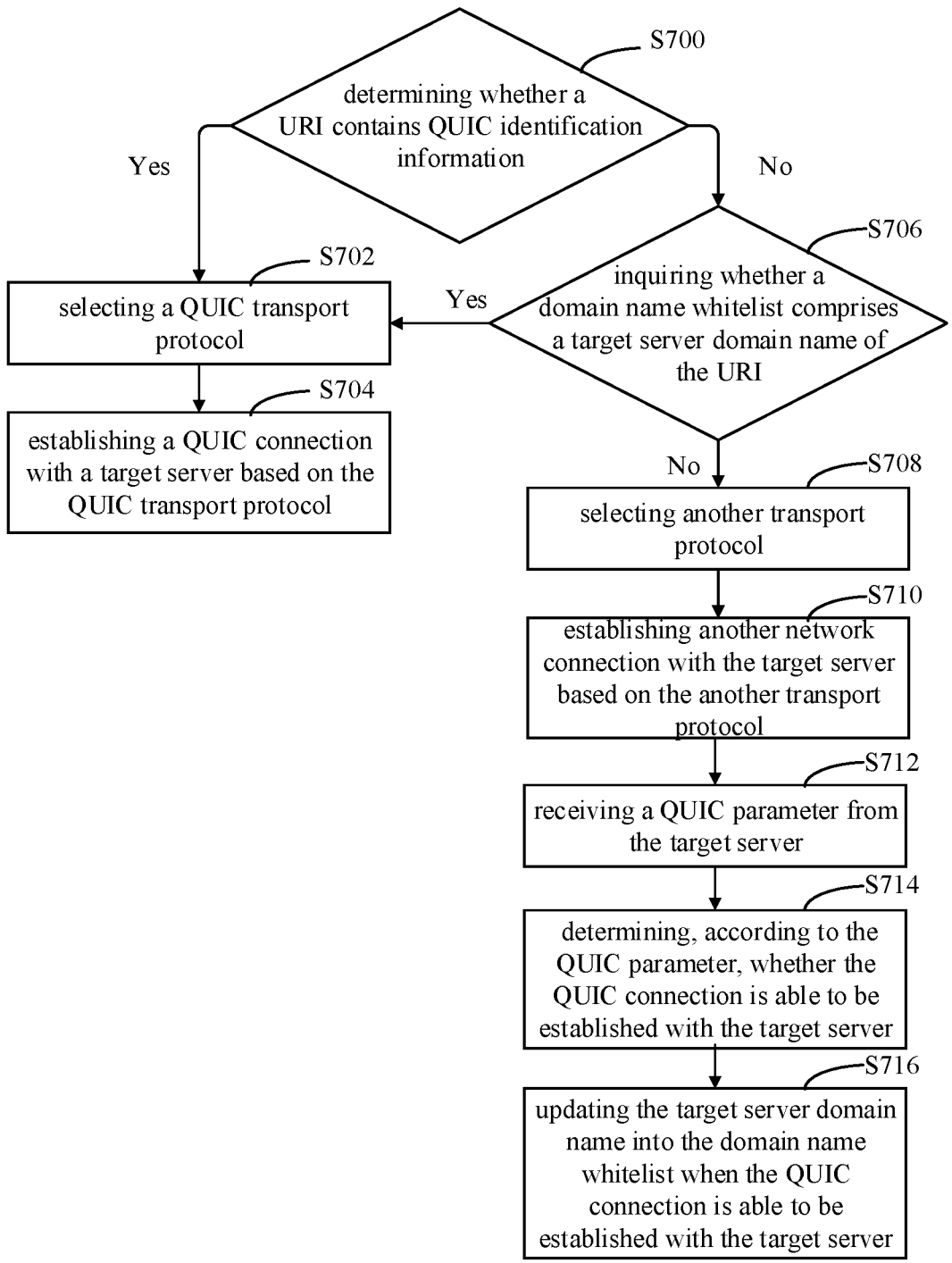
FIG. 10 illustrates a flowchart of a network communication method according to a sixth embodiment of the present application.

FIG. 10 illustrates a flowchart of a network communication method according to a sixth embodiment of the present application. The network communication method includes steps S700~S716, wherein:

Step S700, determining whether a URI comprises QUIC identification information. If yes, the process goes to step S702; if no, the process goes to step S706.

Wherein, the QUIC identification information is configured to indicate that the target server supports a QUIC transport protocol.

Step S702, selecting the QUIC transport protocol.

Step S704, establishing a QUIC connection with a target server based on the QUIC transport protocol.

Step S706, inquiring whether a domain name whitelist comprises a target server domain name of the URI. If yes, the process goes to step S702; if no, the process goes to step S708.

Wherein, the domain name whitelist includes a plurality of domain names supporting the QUIC transport protocol. The domain name whitelist may be pre-configured and updated according to access records of the computing device.

Step S708, selecting another transport protocol.

Wherein, the another transport protocol may be TCP (transmission control protocol), UDP or like. The another transport protocol is preferably the TCP based on a high-requirement of data integrity.

Step S710, establishing another network connection with the target server based on the another transport protocol.

Step S712, receiving a QUIC parameter from the target server.

The target server can send the QUIC parameter to the computing device via the another network connection, the QUIC parameter may be located in an ALTSVC field of an HTTP response header, or located in an ALTSVC frame. ALTSVC, in which have QUIC parameter with a plurality of versions, is used to provide version-negotiation hints, such as a version list. The version list may include one or more transport protocol versions supported by the target server.

For example, "alt-svc: quic=": "443"; ma=2592000; v="44,42,36,31", the foregoing information is used to notify the computing device that a port 443 of the target server supports a plurality of transport protocol versions of the QUIC transport protocol (e.g., version 44, version 42, version 36, and version 31).

Step S714, determining, according to the QUIC parameter, whether the QUIC connection is able to be established with the target server.

For example, detecting, according to the version list in the QUIC parameter, whether the version list includes the transport protocol version supported by the computing device; if the version list includes a transport protocol version supported by the computing device, it is determined that the QUIC connection is able to be established with the target server; if the version list does not include a transport protocol version supported by the computing device, it is determined that the QUIC connection is not able to be established with the target server.

Step S716, updating the target server domain name into the domain name whitelist when the QUIC connection is able to be established with the target server.

Optionally, if the QUIC connection is not able to be established with the target server, whether the domain name whitelist includes the target server domain name is inquired, if yes, the target server domain name is deleted from the domain name whitelist.

Optionally, if the QUIC connection is not able to be established with the target server, the target server domain name is added into the domain name blacklist.

For example, https://test.domain.com/index.html, if the above URI does not comprise QUIC identification information, the another network connection is established based on the another transport protocol (e.g., TCP) and the data transmission operation is performed via the another network connection. The target server could return one or more QUIC parameters when the target server supports the QUIC transport protocol. The computing device receives the one or more QUIC parameters from the target server, and determines, based on the one or more QUIC parameters, whether the computing device can establish a QUIC connection with the target server based on the QUIC transport protocol. If yes, "test.domain.com" is added into the domain name whitelist; if no, "test.domain.com" is not added to the domain name whitelist. It should be noted that the URL is a Uniform Resource Locator and is a subset of the URI. Therefore, the URI described in the embodiment may include a URL.

It's noted, during communicating with the target server based on the another network connection, the target server could return an HTTP response header or ALTSVC frame with one or more QUIC parameters when supporting the QUIC transport protocol; but the target server could also return an HTTP response header or ALTSVC frame with one or more QUIC parameters when not supporting the QUIC transport protocol. Thus, when the fifth embodiment and the sixth embodiment are simultaneously implemented, the "test network connection" in the fifth embodiment can be preferentially used to determine whether to add the target server domain name to the domain name whitelist or the domain name blacklist.

The network communication method described in the sixth embodiment establishes a list system based on the third embodiment, and determines whether a QUIC connection based on the QUIC transport protocol can be established with the target server by a "QUIC parameter". The list system is configured to provide a transport protocol selection basis when the computing device subsequently accesses the target server.

Embodiment 7

Figure 11:
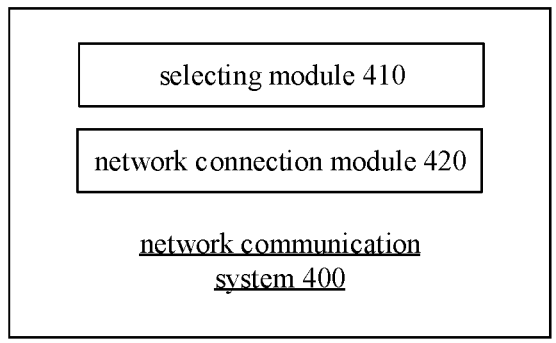
FIG. 11 illustrates a block diagram of program modules of a network communication system according to a seventh embodiment of the present application.

FIG. 11 illustrates a block diagram of program modules of a network communication system according to a seventh embodiment of the present application. The network communication system may be divided into one or more program modules, which are stored in a medium, and executed by one or more processors to implement the embodiment of the present application. The program module referred to in the embodiment of the present application refers to a series of computer program instruction segments capable of accomplishing specific functions, and is more suitable for describing execution process of the network communication system in the medium than the program itself. The following description will specifically describe the functions of the program modules of the embodiment.

As shown in FIG. 11, the network communication system 400 may include a selecting module 410 and a network connection module 420, wherein:

The selecting module 410 determines whether to select a QUIC transport protocol according to a URI.

The network connection module 420 establishes a QUIC connection with a target server based on the QUIC transport protocol when the QUIC transport protocol is selected.

In one exemplary embodiment, the selecting module 410 further determines whether the URI comprises QUIC identification information, the QUIC identification information indicating that the target server supports the QUIC transport protocol; and selects the QUIC transport protocol when the URI comprises the QUIC identification information.

In one exemplary embodiment, the selecting module 410 further selects another transport protocol when the URI does not comprise the QUIC identification information.

In one exemplary embodiment, when the URI does not comprise the QUIC identification information, the selecting module 410 further inquiries whether a domain name whitelist comprises a target server domain name of the URI and selects the QUIC transport protocol when the domain name whitelist comprises the target server domain name of the URI.

In one exemplary embodiment, the selecting the QUIC transport protocol when the domain name whitelist comprises the target server domain name of the URI further comprises: generating an alternate URI according to the URI, the alternate URI comprising the QUIC identification information; establishing the QUIC connection with the target server based on the alternate URI.

In one exemplary embodiment, the selecting module 410 selects another transport protocol when the domain name whitelist does not comprise the target server domain name of the URI.

In one exemplary embodiment, the selecting module 410 further selects the QUIC transport protocol and another transport protocol when the domain name whitelist does not comprise the target server domain name of the URI.

In one exemplary embodiment, the selecting module 410 further establishes the QUIC connection with the target server based on the QUIC transport protocol and establishes another network connection with the target server based on the another transport protocol, and performs a data transmission operation via the QUIC connection or the another network connection.

In one exemplary embodiment, the performing the data transmission operation via the QUIC connection or the another network connection further comprises: detecting a network connection state with the target server, the network connection state comprising a QUIC connection state of the QUIC connection and another network connection state of the another network connection; determining, according to the network connection state, whether the QUIC connection is successfully established, and whether the another network connection is successfully established; performing the data transmission operation via the QUIC connection, when the QUIC connection is successfully established and the another network connection is not successfully established; and performing the data transmission operation via the another network connection, when the another network connection is successfully established and the QUIC connection is not successfully established.

In one exemplary embodiment, the performing the data transmission operation via the QUIC connection or the another network connection further comprises: when the another network connection is successfully established and the QUIC connection is successfully established: performing, according to a pre-configured transport protocol priority, the data transmission operation via the QUIC connection or the another network connection; wherein, the transport protocol priority is configured to indicate a priority usage level between the QUIC transport protocol and the another transport protocol.

In one exemplary embodiment, the selecting module 410 further determines, according to the target server domain name of the URI, whether to update the domain name list when the domain name whitelist does not comprise the target server domain name; wherein, the domain name list includes the domain name whitelist, and the domain name whitelist includes a plurality of domain names supporting the QUIC transport protocol.

In one exemplary embodiment, the domain name whitelist further includes a plurality of QUIC service parameters respectively relating to the plurality of domain names, and the plurality of QUIC service parameters comprising QUIC transport protocol versions supported by each server.

In one exemplary embodiment, the determining whether to update the domain name list according to the target server domain name of the URI further comprises: sending an asynchronous access request to the target server, the asynchronous access request configured to request to establish a test network connection with the target server based on the QUIC transport protocol; determining whether the test network connection is successfully established; updating the target server domain name into the domain name whitelist when the test network connection is successfully established.

In one exemplary embodiment, the determining whether to update the domain name list according to the target server domain name of the URI further comprises: inquiring whether the domain name whitelist comprises the target server domain name of the URI, when the test network connection is not successfully established; deleting the target server domain name from the domain name whitelist, when the domain name whitelist comprises the target server domain name of the URI.

In one exemplary embodiment, the domain name list further comprises a domain name blacklist, the domain name blacklist comprising a plurality of server domain names that do not support the QUIC transport protocol; the determining whether to update the domain name list according to the target server domain name of the URI further comprises: updating the target server domain name into the domain name blacklist when the test network connection is not successfully established.

In one exemplary embodiment, the determining whether to update the domain name list according to the target server domain name of the URI further comprises: receiving a QUIC parameter from the target server; determining, according to the QUIC parameter, whether the QUIC connection is able to be established with the target server; updating the target server domain name into the domain name whitelist when the QUIC connection can be established with the target serve.

In one exemplary embodiment, the QUIC identification information is HTTP Scheme of the URI, the HTTP Scheme comprising one or more characters following the "HTTP".

In one exemplary embodiment, the QUIC identification information comprises a predetermined character string, the predetermined character located in query-string parameters of the URI.

Embodiment 8

Figure 12:
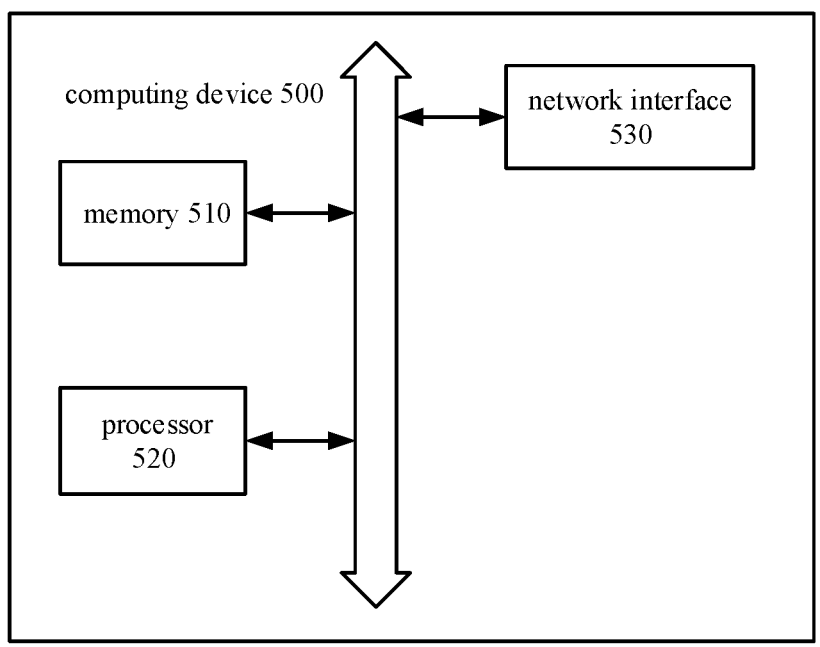
FIG. 12 illustrates a diagram of hardware architecture of a computing device according to an eighth embodiment of the present application.

FIG. 12 illustrates a diagram of hardware architecture of a computing device according to an eighth embodiment of the present application. In the embodiment, the computing device 500 is a device capable of automatically performing numerical calculations and/or information processing according to predefined or stored instructions. For example, computing device 2 can be a Smartphone, tablet, laptop, desktop computer, rack server, blade server, tower server, or cabinet server (including stand-alone servers, or a cluster of multiple servers), and so on. As shown in FIG. 12, the computing device 500 includes, but is not limited to, a memory 510, a processor 520, and a network interface 530 that can be communicated with each other through a system bus. Of which:

The memory 510 includes at least one type of computer-readable storage medium. The readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 510 may be an internal storage module of the computing device 500 such as a hard disk or memory of the computing device 500. In other embodiments, the memory 510 may also be an external storage device of the computing device 500, such as a plugged hard disk provided on the computing device 500, a smart media card (SMC), secure digital (SD) card, a flash memory card, and the like. Of course, the memory 510 may also include both an internal storage module and an external storage device of the computing device 500. In the embodiment, the memory 510 is generally used to store an operating system and various types of application software installed in the computing device 500 such as program codes of the network communication method and the like. In addition, the memory 510 may also be used to temporarily store various types of data that have been or will be outputted.

The processor 520, in some embodiments, may be a central processing unit (CPU), a controller, a microprocessor, or other data processing chip. The processor 520 is generally used to control the overall operation of the computing device 500 such as performing control and processing related to data interaction or communication with the computing device 500. In the embodiment, the processor 520 is used to run program code stored in the memory 510 or process data.

The network interface 530 may include a wireless network interface or a wired network interface which is generally used to establish a communication connection between the computing device 500 and other computing devices. For example, the network interface 530 is used for connecting the computing device 500 to an external terminal via a network and establishing a data transmission channel and a communication connection between the computing device 500 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 12 shows only a computing device 500 having components 21-23, but it is understood that it is not required to implement all of the shown components and that more or fewer parts can be implemented in lieu thereof.

In the embodiment, a network communication method stored in the memory 510 may be divided into one or more program modules and executed by one or more processors (processor 510 in the embodiment) to complete the present application.

Embodiment 9

The embodiment provides a computer-readable storage medium, which stores one or more computer programs, the one or more programs can be executed by at least one processor, to cause the at least one processor to embody operation of the network communication method in the embodiment.

In the embodiment, the computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the computer-readable storage medium may be an internal storage module of the computing device 500 such as a hard disk or memory of the computing device 500. In other embodiments, the memory 510 may also be an external storage device of the computing device 500, such as a plugged hard disk provided on the computing device, a smart media card (SMC), secure digital (SD) card, a flash memory card, and the like. Of course, the computer-readable storage medium may also include both an internal storage module and an external storage device of the computing device. In the embodiment, the computer-readable storage medium is generally used to store an operating system and various types of application software installed in the computing device 500 such as program codes of the network communication method and the like. In addition, the memory 510 may also be used to temporarily store various types of data that have been or will be outputted.

Apparently, it should be appreciated by those skilled in the art that each module or step described in the embodiment of the present application can be realized by a general-purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A network communication method, comprising:
generating a request for accessing a target server by a computing device, wherein the request comprises a Uniform Resource Identifier (URI);
determining whether to select a Quick UDP Internet Connections (QUIC) transport protocol based on the URI;
selecting the QUIC transport protocol in response to a determination that the URI comprises QUIC identification information, wherein the QUIC identification information indicates that the target server supports the QUIC transport protocol; and
establishing a QUIC connection with the target server via a QUIC stack of the computing device according to the QUIC transport protocol.

2. The method of claim 1, wherein the determining whether to select a Quick UDP Internet Connections (QUIC) transport protocol based on the URI further comprises:
inquiring whether a domain name whitelist comprises a target server domain name of the URI when the URI does not comprise the QUIC identification information; and
selecting the QUIC transport protocol when the domain name whitelist comprises the target server domain name of the URI.

3. The method of claim 2, wherein the selecting the QUIC transport protocol when the domain name whitelist comprises the target server domain name of the URI further comprises:
generating an alternate URI according to the URI, the alternate URI comprising the QUIC identification information;
establishing the QUIC connection with the target server based on the alternate URI.

4. The method of claim 2, wherein the determining whether to select the QUIC transport protocol based on the URI further comprises:
selecting both the QUIC transport protocol and another transport protocol when the domain name whitelist does not comprise the target server domain name of the URI.

5. The method of claim 4, further comprising:
establishing the QUIC connection with the target server based on the QUIC transport protocol and establishing another network connection with the target server based on the another transport protocol; and
performing a data transmission operation via the QUIC connection or the another network connection.

6. The method of claim 5, wherein the performing the data transmission operation via the QUIC connection or the another network connection further comprises:
detecting a network connection state with the target server, the network connection state comprising a QUIC connection state and an another network connection state;
determining, according to the network connection state, whether the QUIC connection is successfully established and whether the another network connection is successfully established;
performing the data transmission operation via the QUIC connection when the QUIC connection is successfully established and the another network connection is not successfully established; and
performing the data transmission operation via the another network connection when the another network connection is successfully established and the QUIC connection is not successfully established.

7. The method of claim 6, wherein the performing the data transmission operation via the QUIC connection or the another network connection further comprises:
performing, according to a pre-configured transport protocol priority, the data transmission operation via the QUIC connection or the another network connection when the another network connection is successfully established and the QUIC connection is successfully established, wherein the transport protocol priority is configured to indicate a priority usage level between the QUIC transport protocol and the another transport protocol.

8. The method of claim 6, wherein the performing the data transmission operation via the QUIC connection or the another network connection further comprises:
in response to a determination that both the another network connection and the QUIC connection are successfully established:
obtaining network connection parameters indicative of network transmission quality, the network connection parameters comprising QUIC connection parameters of the QUIC connection and other network connection parameters of the another network connection;
performing, according to the network connection parameters, the data transmission operation via the QUIC connection or the another network connection.

9. The method of claim 2, wherein the determining whether to select the QUIC transport protocol based on the URI further comprises:
determining whether to update the domain name list based on the target server domain name of the URI when the domain name whitelist does not comprise the target server domain name;
wherein the domain name list comprises the domain name whitelist, and the domain name whitelist comprises a plurality of domain names supporting the QUIC transport protocol.

10. The method of claim 9, wherein the domain name whitelist further comprises a plurality of QUIC service parameters respectively relating to the plurality of domain names, each QUIC service parameter comprising QUIC transport protocol versions supported by a corresponding server.

11. The method of claim 9, wherein the determining whether to update the domain name list based on the target server domain name of the URI further comprises:
   sending an asynchronous access request to the target server, the asynchronous access request configured to request for establishing a test network connection with the target server based on the QUIC transport protocol;
   determining whether the test network connection is successfully established;
   updating the target server domain name into the domain name whitelist when the test network connection is successfully established.

12. The method of claim 11, wherein the determining whether to update the domain name list based on the target server domain name of the URI further comprises:
   inquiring whether the domain name whitelist comprises the target server domain name of the URI when the test network connection is not successfully established;
   deleting the target server domain name from the domain name whitelist when the domain name whitelist comprises the target server domain name of the URI.

13. The method of claim 11, wherein the domain name list further comprises a domain name blacklist, the domain name blacklist comprising a plurality of server domain names that do not support the QUIC transport protocol;
   the determining whether to update the domain name list based on the target server domain name of the URI further comprises:
   updating the target server domain name into the domain name blacklist when the test network connection is not successfully established.

14. The method of claim 9, wherein the determining whether to update the domain name list based on the target server domain name of the URI further comprises:
   receiving a QUIC parameter from the target server;
   determining, according to the QUIC parameter, whether the QUIC connection is able to be established with the target server;
   updating the target server domain name into the domain name whitelist in response to a determination that the QUIC connection is able to be established with the target server.

15. The method of claim 1, wherein the QUIC identification information is HTTP Scheme of the URI, the HTTP Scheme comprising one or more characters following "HTTP".

16. The method of claim 1, wherein the QUIC identification information comprises a predetermined character string, the predetermined character located in query-string parameters of the URI.

17. A computing device, comprising:
   at least one processor; and
   at least one memory communicatively coupled to the at least one processor and storing instructions that upon execution by the at least one processor cause the computing device to:
   generate a request for accessing a target server by the computing device, wherein the request comprises a Uniform Resource Identifier (URI);
   determine whether to select a Quick UDP Internet Connections (QUIC) transport protocol based on the URI;
   select the QUIC transport protocol in response to a determination that the URI comprises QUIC identification information, wherein the QUIC identification information indicates that the target server supports the QUIC transport protocol; and
   establishing a QUIC connection with the target server via a QUIC stack of the computing device according to the QUIC transport protocol.

18. The computing device of claim 17, the at least one memory further storing instructions that upon execution by the at least one processor cause the computing device to:
   inquire whether a domain name whitelist comprises a target server domain name of the URI in response to a determination that the URI does not comprise the QUIC identification information;
   generate an alternate URI according to the URI in response to selecting the QUIC transport protocol when the domain name whitelist comprises the target server domain name of the URI, wherein the alternate URI comprises the QUIC identification information; and
   establish the QUIC connection with the target server based on the alternate URI.

19. A non-transitory computer-readable storage medium comprising computer-readable instructions that upon execution by at least one processor cause the at least one processor at least to:
   generate a request for accessing a target server by the computing device, wherein the request comprises a Uniform Resource Identifier (URI);
   determine whether to select a Quick UDP Internet Connections (QUIC) transport protocol based on the URI;
   select the QUIC transport protocol in response to a determination that the URI comprises QUIC identification information, wherein the QUIC identification information indicates that the target server supports the QUIC transport protocol; and
   establishing a QUIC connection with the target server via a QUIC stack of the computing device according to the QUIC transport protocol.

* * * * *